United States Patent [19]
Lawrence

[11] Patent Number: 6,065,744
[45] Date of Patent: May 23, 2000

[54] WORK HOLDER PRECISELY ADJUSTABLE JAWS

[76] Inventor: Joseph W. Lawrence, 21702 Erie St., Saegertown, Pa. 16433

[21] Appl. No.: 09/370,177

[22] Filed: Aug. 9, 1999

[51] Int. Cl.⁷ .................................................... B23Q 3/00
[52] U.S. Cl. .......................... 269/287; 269/268; 269/902
[58] Field of Search ................... 269/287, 902, 269/90, 101, 172, 268

[56] References Cited

U.S. PATENT DOCUMENTS

| | | | |
|---|---|---|---|
| 3,887,202 | 6/1975 | Zapart | 279/5 |
| 4,583,432 | 4/1986 | Bricker | 82/1 C |

*Primary Examiner*—Timothy V. Eley
*Assistant Examiner*—Benjamin M. Halpern
*Attorney, Agent, or Firm*—James F. Cottone

[57] ABSTRACT

A dual jawed adjustable workpiece holder is formed as a highly versatile V-block related device wherein the V-point may be precisely shifted in vernier increments along both X and Y axes in response to lead screw driven translations of one or both adjustable jaws along parallel axes. The pair of mirror image jaws are slidably retained in an interior, U-shaped cavity formed into a rectangular shaped overall workpiece holder. Upon being adjusted to translate a workpiece to a desired location in an XY plane, individual locking screws secure the jaws in position. The thus configured workpiece holder may be used in combination with various grinding machines and clamping means to rapidly and precisely position and retain a workpiece with a high degree of positional repeatability.

15 Claims, 4 Drawing Sheets

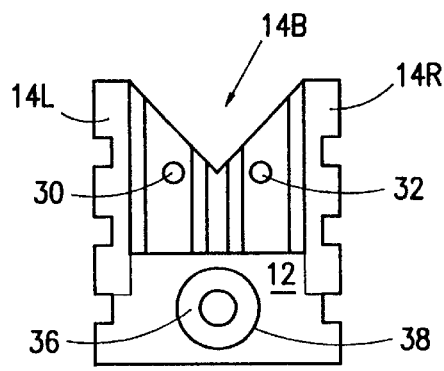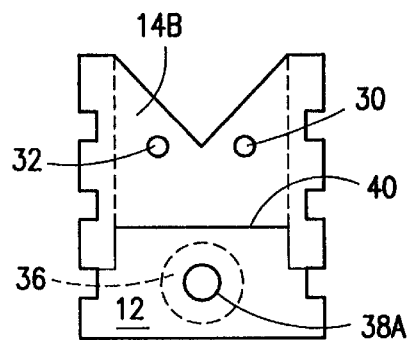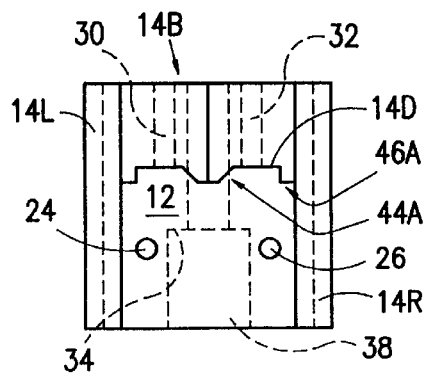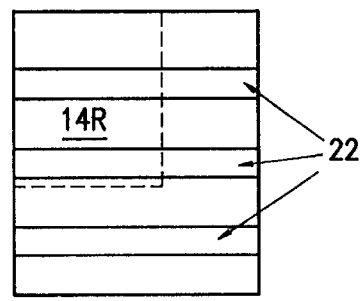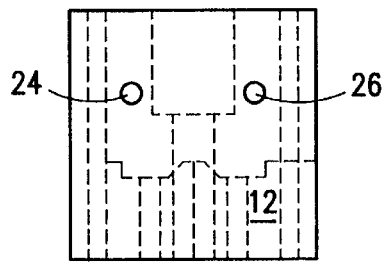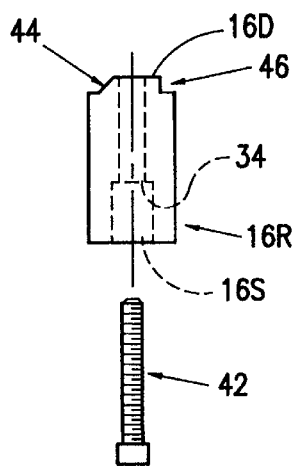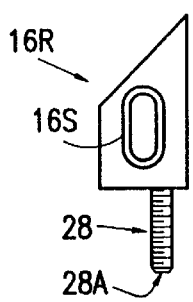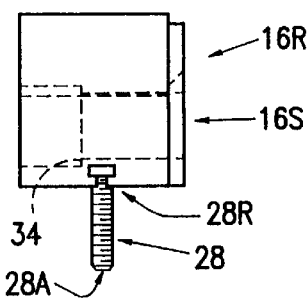

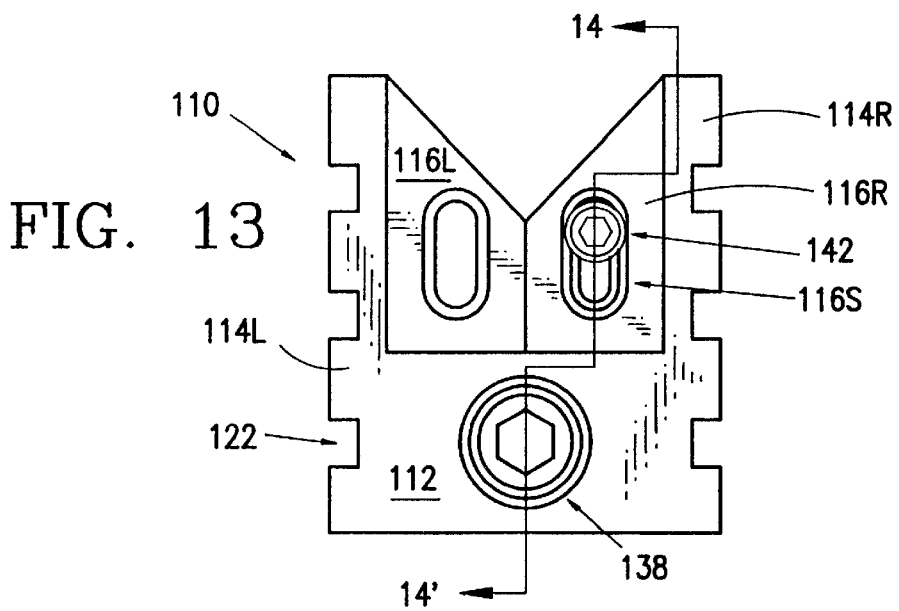
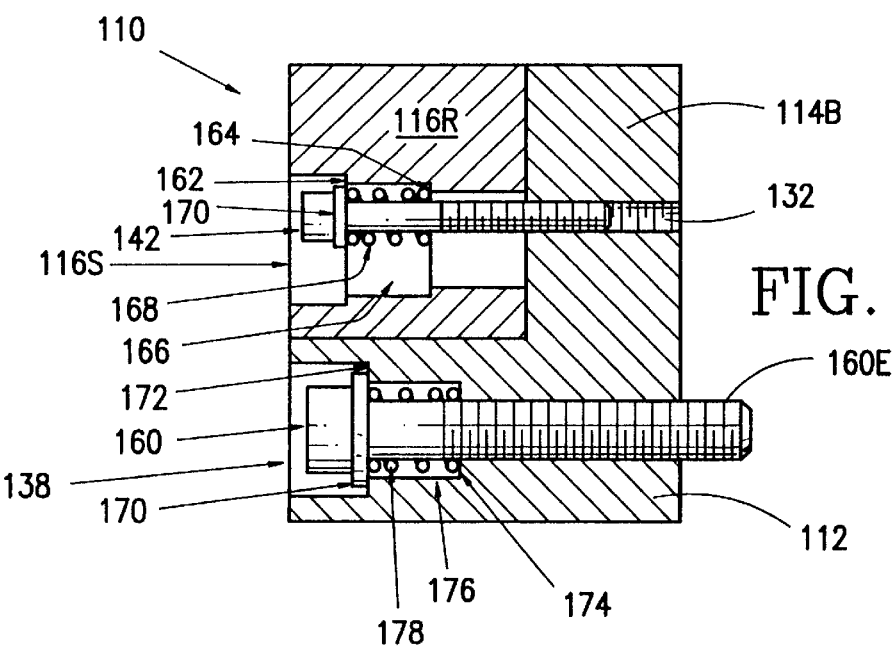
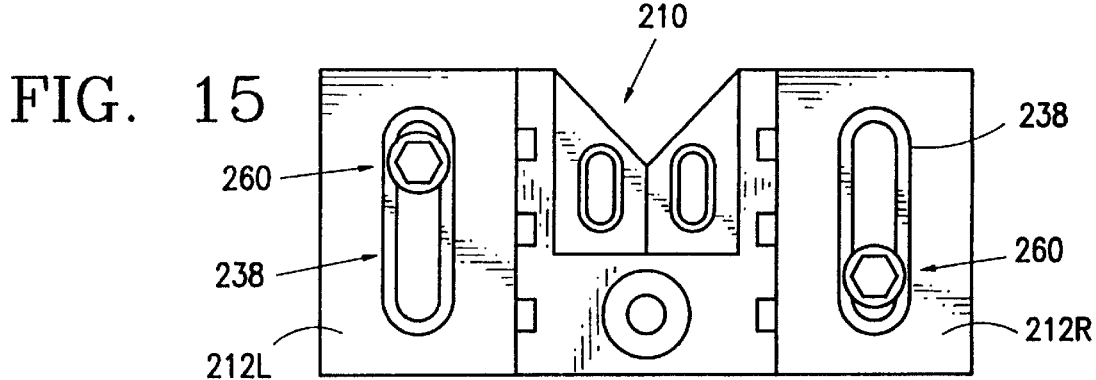

WORK HOLDER PRECISELY ADJUSTABLE JAWS

TECHNICAL FIELD

The present invention relates generally to workpiece holders used by machinists, and more particularly to a workpiece holder having a pair of individually adjustable jaws that allow the workpiece to be precisely translated along both X and Y axes while being rigidly retained in a V-block-like holder.

BACKGROUND

Machinists have been grappling with the problems of securely clamping and holding workpieces in order to carry out desired machining operations for as long as machine shops have been in existence. Due to the wide variety in sizes and shapes of workpieces, and the wide range of machining operations to be performed on them, machinists are continuously challenged to come up with the right workpiece holder for many unusual or specialized jobs. The venerable V-block emerged early on as the best multipurpose device in this regard, and has served thereafter as the baseline workpiece holder from which a wide range of variants have evolved. No matter what type of workpiece is involved—rectangular, cylindrical, curved castings, or other odd shapes big or small—and regardless of what type of machining operation is to be performed—grinding, drilling, cutting, milling, and so forth—there is most likely some form of V-block that will properly retain the workpiece while the operation is being completed.

Descriptions of typical prior art devices for clamping and holding workpieces during machining operations are found in a number of U.S. patents.

U.S. Pat. No. 1,372,661 to Secord discloses an early (1921) workpiece holding appliance having three separately adjustable jaws, each of which may be individually adjusted in both rotation and traverse.

U.S. Pat. No. 4,340,211 to Chiappetti discloses a V-block clamp having individually adjustable jaws that are directed mainly to holding items having curved outer surfaces, such as cylindrical workpieces. A cylindrical workpiece retained in the clamp disclosed would experience combined up/down as well as left/right movement in response to an adjustment of either jaw.

U.S. Pat. No. 4,583,432 to Bricker discloses a method of centering an article relative to a concentrically rotatable cylinder which includes a slightably adjustable centering member as part of a more or less conventional V-block device.

Additional teachings of various types of prior art workpiece holders are found in U.S. Pat. No. 3,887,202 to Zapart, U.S. Pat. No. 3,094,821 to Eckert and U.S. Pat. No. 1,349,963 to Jerrim.

Despite the generous number of devices and techniques taught in the prior art, it is not uncommon for a tool maker to have to make up special jigs for a particular unusual part or machining task. However, these one time "fixes" are time consuming, often requiring auxiliary elements such as shims, spacers, and the like, and rarely lend themselves to a high degree of precision repeatability for follow on finished articles. Additionally, most V-block based workpiece holders favor carrying out machining operations (especially grinding) at locations on the workpiece which are symmetrical with respect to the outer dimensions of the workpiece. Indeed, to machine or grind a radius or diameter on a workpiece with the center line not symmetrical with its outside surfaces has been declared by many great toolmakers to be one of the most difficult tasks to do or to teach. Even when this particular task is actually accomplished, the repeatability of the process for multiple workpieces remains difficult to achieve. It is precisely this set of needs that the present adjustable jaw workpiece holder meets, thereby satisfying a long standing need for a simple V-block based workpiece holder having a V-point that is rapidly and precisely adjustable along both X and Y axes.

OBJECTS OF THE INVENTION

It is therefore a primary object of the present invention to provide an improved adjustable jaw workpiece holder that overcomes the disadvantages of the prior art approaches.

A further object of the present invention is to provide a workpiece holder having a pair of jaws that are individually adjustable along parallel axes such that the workpiece holder V-point can be smoothly and precisely shifted along a pair of orthogonal axes.

A still further object of the present invention is to provide an adjustable jaw workpiece holder wherein each of a pair of jaws is individually adjustable along a first axis and produces the effect of translating a workpiece retained between them along two axes.

A yet further object of the present invention is to provide an adjustable jaw workpiece holder wherein each of a pair of jaws is individually adjustable in position along first parallel axes responsive to the rotation to an adjusting screw, and is individually lockable in position responsive to the action of a locking screw.

In a preferred embodiment, a dual jawed adjustable workpiece holder is formed as a modified V-block device wherein the V-point may be precisely shifted in fine increments along both X and Y axes in response to movement of one or both jaws along the Y axis. In a preferred embodiment, the adjustable jaw workpiece holder includes a pair of mirror image jaws with workpiece engaging upper surfaces formed at 45 degree angles to yield the well known 90 degree V-block angle. The two jaws are slidably retained in a U-shaped central cavity formed into a rectangular overall device, the cavity defined by left, right and back walls rising from a base, and each jaw may be raised or lowered within the cavity by means of a lead screw accessible through openings in the device base. After being set at the desired positions, such that the device's V-point is suitably positioned in the XY plane, individual locking screws secure the jaws in position. In use, the adjustable jaw workpiece holder may be used in combination with various grinding machines and clamping means to rapidly and precisely position and retain a workpiece with a high degree of positional repeatability.

BRIEF DESCRIPTION OF THE DRAWINGS

Additional objects and advantages of the invention will become apparent to those skilled in the art as the description proceeds with reference to the accompanying drawings wherein:

FIG. 3 is a front elevational view of the workpiece holding device of FIG. 1 with the pair of adjustable jaws removed for clarity;

FIG. 4 is a back elevation of the workpiece holding device of FIG. 1;

FIG. 5 is a top plan view of the workpiece holding device of FIG. 1, also with the pair of jaws not present;

FIG. 6 is a right side elevation of the workpiece holding device of FIG. 1;

FIG. 7 is a bottom plan view of the workpiece holding device of FIG. 1;

FIG. 8 is a front elevational view of the right jaw including an adjusting screw;

FIG. 9 is a right elevational view of the right jaw of FIG. 8;

FIG. 10 is a top plan view of the right jaw of FIG. 8;

FIG. 13 is a front elevational view of an alternate embodiment of an adjustable jaw workpiece holding device having spring loaded jaw locking and device anchoring means;

FIG. 14 is a cross sectional view of the alternate device of FIG. 13 taking along the twice shifted viewing lines labeled 14–14'; and FIG. 15 is an elevational view of an alternate embodiment of an adjustable jaw workpiece holding device having a plurality of device anchoring bolt channels.

BEST MODE FOR CARRYING OUT THE INVENTION

Figure 1:
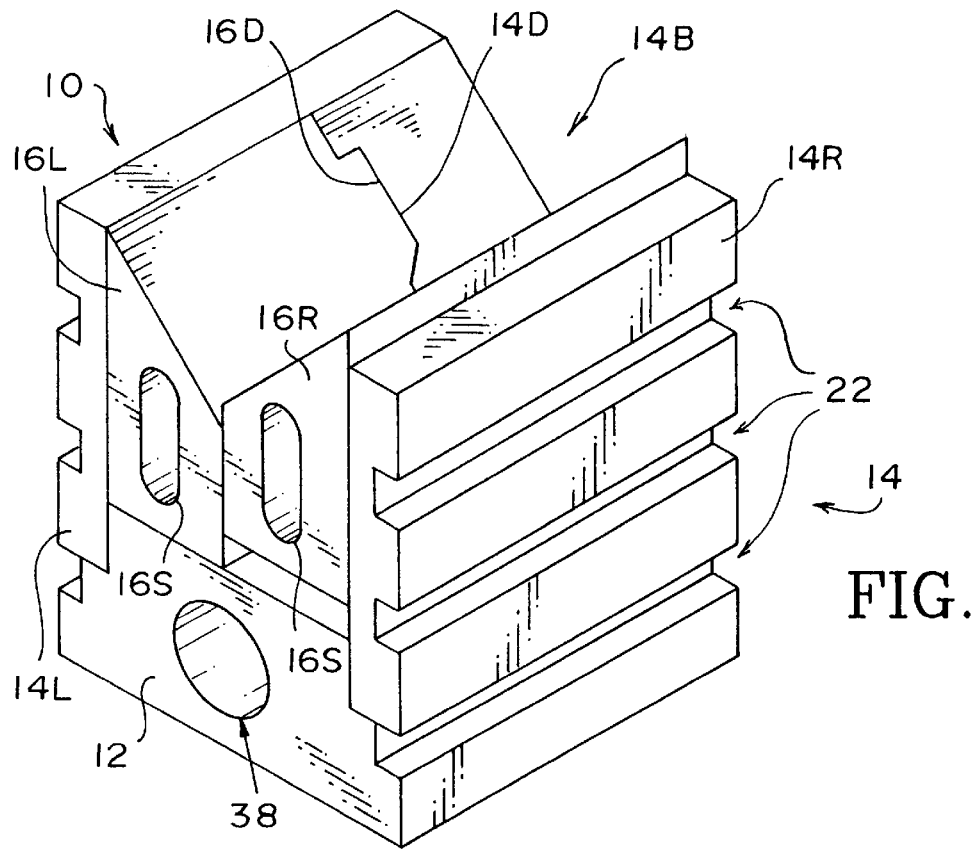
FIG. 1 is a top perspective view of a workpiece holding device having a pair of individually adjustable jaws, according to the present invention.

Referring now to FIG. 1, there is shown a perspective view of a workpiece holding device having a pair of precisely adjustable jaws structured to function according to the present invention. The adjustable jaw workpiece holder 10 includes a base member 12 which carries a frame 14 having a left wall 14L, a right wall 14R and a back wall 14B. Positioned within the rectangular U-shaped opening formed within these three walls are a pair of precisely fitted left and right jaws 16L and 16R which are individually adjustable to slide vertically with respect to each other and with respect to the base member 12 by lead screws to be described below. The vertical movement of this pair of jaws is guided by cooperating dovetail-like track elements 16D and 14D formed into each jaw 16L and 16R, and into the back wall 14B respectively. An upper workpiece engaging face of both jaws is machined at complimentary 45 degree angles such that a workpiece placed into the jaws 16L and 16R is held by the well known 90 degree V-block angle. When the jaws 16L and 16R have been properly positioned, as will be described herein below, they are securely locked into position by individual locking screws (not shown) fitted within racetrack-like shaped slots 16S.

Figure 2:
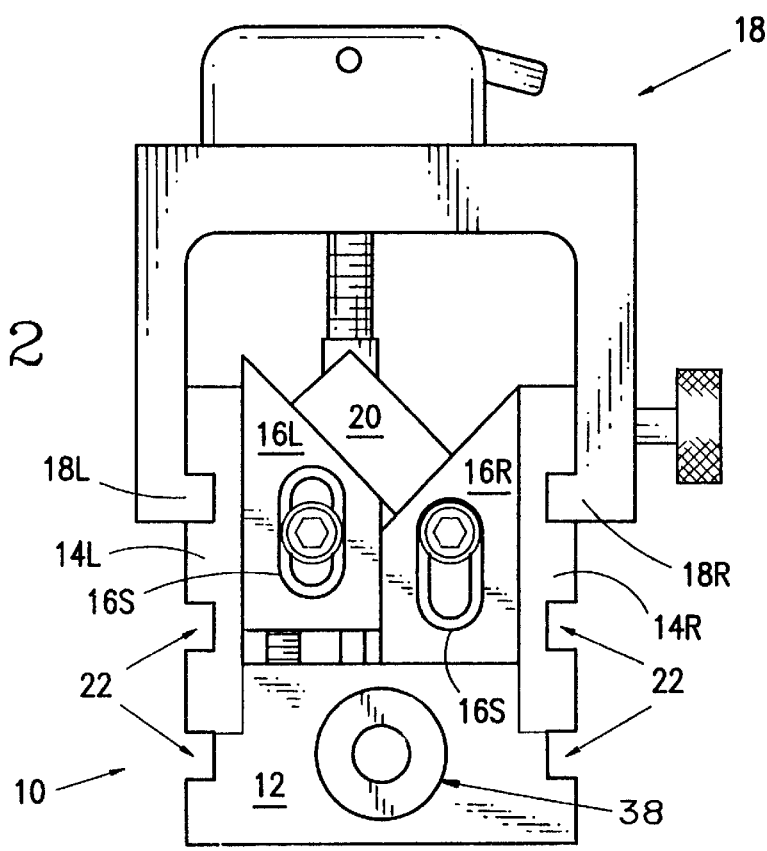
FIG. 2 is a front elevational view of the adjustable jaw holding device of the present invention used in combination with a rapid action cam-lock workpiece clamp.

By way of a brief indication of a typical usage of the adjustable jaw workpiece holder 10, refer to FIG. 2. FIG. 2 is a front elevational view of the adjustable jaw holder 10 deployed in combination with a rapid action cam-lock clamp 18 to securely retain a workpiece 20 in position for machining or grinding. This workpiece holding arrangement is well known to machinists; legs 18L and 18R of the clamp 18 engaging a suitably located pair of slots 22 selected from a plurality of similar slots 22 formed into the outboard faces of the frame walls 14L and 14R. The thus positioned and secured workpiece 20 is then affixed to the bed of a grinding machine, illustratively, for precision grinding or machining of radii in a range of locations on the workpiece. Whereas shims are generally employed within the 90 degree jaws of a fixed V-block device to translate a workpiece up/down or left/right for various positioning purposes, the precise adjustability of the jaws 16L and 16R readily accomplish this translating in a positive and highly repeatable manner. For a detailed description of the action of the cam-lock clamp 18, the interested reader is referred to the teachings of the U.S. Pat. No. 5,005,813, issued in 1991 to Joseph W. Lawrence. The clamp 18 does not, however, form a part of the present invention.

Before proceeding with a detailed description of the structures and functions of the adjustable jaw workpiece holder 10, it is worthwhile to note that the particular structural embodiment set forth in broad terms in connection with the description of FIG. 1 is only one of many configurations that may be employed. For example, while the description has defined a rectangular U-shaped cavity bounded by separate wall, back and base structures to hold the pair of vertically adjustable, lockable jaws, other structural arrangements are equally suitable. In a first preferred embodiment, the three walls forming the frame (14L, 14R and 14B) may be separately made and affixed to the base member 12. Alternatively, these four components may be machined from a single block of material, or precision cast molded as a one piece member. Similarly, the dovetail-tracks as well as the plurality of side notches may be replaced by other interfitting elements having functionally equivalent geometries.

The means for adjusting and locking the position of jaws 16L and 16R within the adjustable jaw holder 10 are best seen with reference to FIGS. 3, 5, 8 and 9. FIGS. 3 and 5 show, respectively, a front elevational view and a top plan view of the adjustable jaw holder 10, and FIGS. 8 and 9 show, respectively, front and right side elevations of the right jaw 16R. Operation of both jaws are essentially identical, their structures being mirror images of each other, so only the action of the right jaw 16R will be described.

A pair of threaded adjusting holes 24 and 26 are formed into the base member 12, as best seen in FIG. 5. The hole 26 receives an adjusting screw 28 rotatably carried by the right jaw 16R, as best seen in FIGS. 8 and 9. When the right jaw 16R is positioned into the corner formed by the right wall 14R and the back wall 14B, such that the sliding dovetail portions 16D and 14D mesh, the screw 28 may be turned to positively establish the desired vertical position of the jaw 16R with respect to the base member 12. An allen wrench routed through the hole 26 via the bottom surface of bottom element 12 into a corresponding hex receptacle at the tip 28A of screw 28 accomplishes the desired vertical jaw adjusting. A T-slot structure 28R at the root of the screw 28 keeps the screw 28 captive within a cavity in the jaw 16R allowing bidirectional jaw adjustment with negligible lost motion. Well known ball joint structures may substitute for the captive T-slot structures. As is well known, the screw pitch sets the advance/retract rate of the jaw 16R, and very finely positioned vernier increments are readily achievable.

A pair of threaded jaw locking holes 30 and 32 are formed into the back wall 14B, as best seen in FIG. 3. The hole 32 receives a locking screw (not shown) routed through the elongated slot 16S of the right jaw 16R such that the head of the locking screw bears against a shoulder 34 formed into the slot 16S to securely lock the jaw 16R against the back member 14B.

In use, after the position of the jaws 16L and 16R have been established and locked, and a workpiece has been suitably positioned and secured (as by the clamp 18 of FIG. 2), then the entire combination may be anchored to the bed of a grinding machine by an anchoring bolt (not shown) which bears on a shoulder 36 of an anchoring bolt channel 38 formed into the base 12.

FIGS. 4, 6, 7 and 10 provide further views of the adjustable jaw holder 10. FIGS. 4, 6 and 7 (as with FIGS. 3 and 5) have been rendered without the inclusion of jaws 16L and 16R for simplicity and clarity. FIG. 4 is a rear elevational view showing the reduced diameter 38A of the anchoring bolt channel as it exits the base member 12, and further shows a line 40 which appears when the adjustable jaw holder 10 is assembled from the distinct components as previously described. For the one piece embodiment, the line 40, would obviously not be present. FIG. 6 shows a right side elevation (depicting the plurality of side slots 22), the left side being a mirror image thereof; FIG. 7 shows a bottom plan view; and FIG. 10 shows a top plan view of the right jaw 16R clearly depicting the extent of the jaw slot 16S, the dovetail-like channel 16D in more detail, and a locking screw 42 which engages the hole 32 (of FIG. 3).

As the locking screw 42 progressively bears on the shoulder 34 formed into jaw locking slot 16S, a sloped wall surface 44 progressively forces the jaw 16R into precise parallel alignment with the Y axis of the device 10. This is accomplished by virtue of its precise mating with an oppositely sloped surface 44A formed into the mating dovetail portion 14D. A track notch 46, rectangular in cross section, also formed into the jaw 16R contributes to the precise translational tracking as the jaw is being locked, as well as when it is being adjustably positioned. This is accomplished by virtue of its precise mating with an oppositely shaped track identation or shoulder 46A formed into the mating dovetail portion 14D. Both 44A and 46A are best seen with brief reference to FIG. 5.

Figure 11:
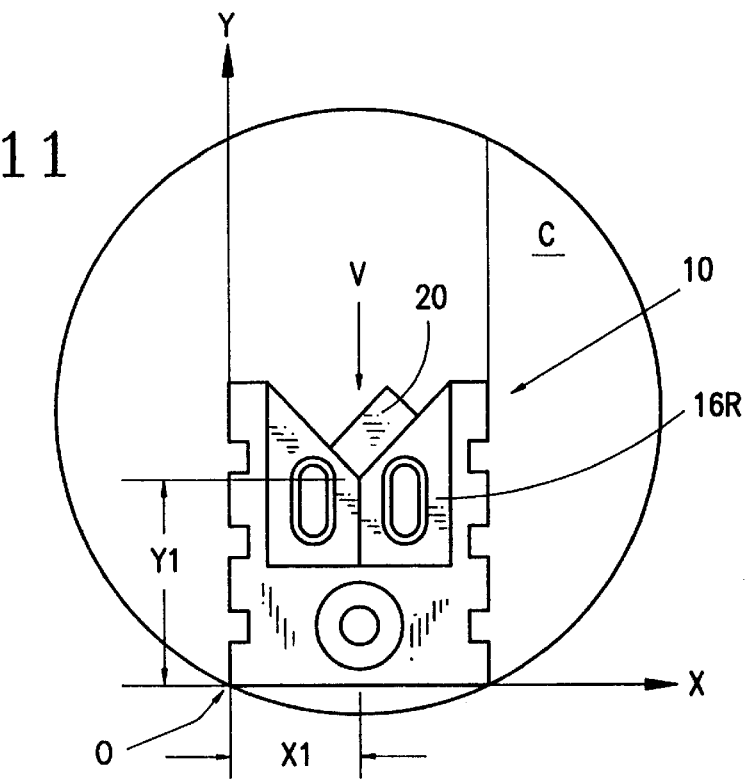
FIG. 11 shows the workpiece holding device mounted in a circular fixture with both adjustable jaws in their bottomed positions.
Figure 12:
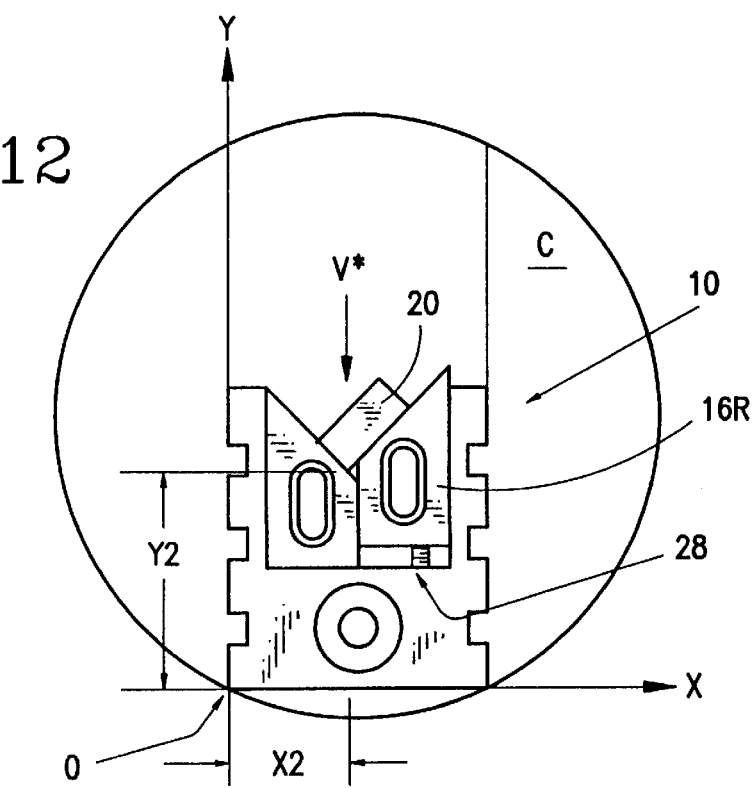
FIG. 12 shows the workpiece holding device mounted in a circular fixture with the right jaw slightly elevated so as to shift the V-point.

As previously indicated, the adjustable jaw workpiece holder 10 functions to smoothly and positively translate a workpiece nestled in its pair of jaws in an XY plane responsive to individual adjusting and locking means. These actions are now described with reference to FIGS. 11 and 12. FIGS. 11 and 12 show a workpiece 20 fitted into a variably positioned V-point "VI" of the holder 10, with the holder 10 mounted, illustratively, in a circular rotatable fixture C, as may be called for in specialized applications. With both jaws 16L and 16R in their bottomed (or unelevated, or retracted) positions as shown in FIG. 11, the V-point is located at X and Y coordinates of X1 and Y1 respectively, referenced to the intersection O of the X and Y axes as labeled. The Y axis as shown defines a longitudinal axis for the various holder embodiments. Upon raising the right jaw 16R by advancing the adjusting screw 28, the workpiece 20 is shifted both upwards and to the left as shown by the new coordinates of X2 and Y2 of the translated V-point V*. As expected, one unit of positional change (elevation or +Y movement in this case) of jaw 16R produces 0.5 units of position change in both the X and Y coordinates of the V-point so that Y2 is greater than Y1, and X2 is less than X1. Adjustment of the left jaw 16L (not depicted) would produce similar positional shifts. Thus, positional changes (up or down) in either of the two jaws along axes parallel to each other and also parallel to the Y axis produces precise and positive movement of a retained workpiece in the XY plane, leading to significant improvements in the repeatability of workpiece grinding, especially for problem applications.

An alternate embodiment of the adjustable jaw workpiece holder is shown in the front elevational view of FIG. 13 and in a corresponding cross sectional view of FIG. 14. In this embodiment, a jaw locking screw 142 and a device anchoring bolt 160 provide their locking and anchoring actions via separate helical locking springs. The dovetail sections have been omitted from FIG. 14 for simplicity, and major correspondingly designated components numbered in the 100 series function as those previously described. For the jaw locking action, the spring embodiment is best described with reference to FIG. 14 with occasional reference to FIG. 9. As before, only the action of the right jaw is described. Whereas FIG. 9 shows an elongated locking slot 16S formed to include a single shoulder 34 at the junction of the two slot sizes, the compound cross section of FIG. 14 shows a locking slot 116S having two shoulders 162 and 164 formed into a right jaw 116R. As with the previously described jaw locking slot 16S, the locking slot 116S is racetrack-like in cross section along all of its three distinct regions, with the elongated axis of the racetrack oriented along the Y axis of the device 110. A spring pocket 166 is formed between the outer shoulder 162 and the inner shoulder 164 to house a helical spring 168 deployed around the shaft of the locking screw 142. The spring 168 is chosen to be of suitable dimensions and spring constant for the uses intended. To lock the jaw 116R, the locking screw 142 is progressively advanced into a threaded locking hole 132 formed into a back wall 114B such that the head of screw 142, through an intervening washer 170, bears against the spring 168. The spring 168 in turn bears against the inner shoulder 164 (possibly via a washer, not shown) of the jaw 116R to urge it into the back wall 114B thereby securely locking the jaw 116R. The vertical extent of the locking screw 116S is not shown to scale, so the extent of the allowable vertical motion of the jaw 116R with respect to the diameter of the locking bolt 142 may be greater than that shown. Note that by replacing the washer 170 by one of greater diameter, and/or by using a bolt head large enough to engage the outer shoulder 162, this alternate embodiment may be locked in the same non-spring manner as previously described. Thus, the present alternate embodiment provides a dual function jaw locking capability.

For the device anchoring action, a similar approach is shown wherein a device anchoring bolt 160 may anchor the device 110 to an external machine also through an intervening spring. Again there is shown two shoulders formed into an anchoring bolt channel 138. Between an outer shoulder 172 and an inner shoulder 174 there is formed a spring pocket 176 which houses a helical spring 178 of suitable properties. To anchor the device 110 to an external machine (not shown), the anchor bolt 160 is progressively advanced such that its extremity 160E threadedly engages a mating hole in the external machine causing the head of the bolt 160 through an intervening washer 170 to bear against the spring 178. The spring 178 in turn bears against the inner shoulder 174 (possibly via a washer not shown) of the base member 112 thereby securely anchoring the device 110. Again, the two shouldered approach provides a dual function anchoring action by allowing the bypassing of the spring using larger sized bolt heads and washers, if desired.

There are occasions when using the adjustable jaw workpiece holder 10 of FIGS. 1–10 or 110 of FIGS. 13 and 14 that call for alternate anchoring approaches. Referring to FIG. 15, there is shown a front elevation of a workpiece holder 210 having dual anchor bolt base portions 212L and 213R. The left and right base portions 212L and 212R may be integrally or separately formed, and affixed to the centrally disposed holder 210 by any well known means, such as bolts, clips, welding and the like. Each base portion includes identical racetrack-like shaped anchoring bolt channels 238 which cooperate with separate anchor bolts 260 to anchor the holder 210 to an external machine in the manner described in connection with FIG. 14. However, as the anchor bolt channels 238 are racetrack-like in shape (similar to 16S and 116S), positioning the device 210 in the XY plane allows for a generous amount of rotational freedom, in addition to the benefit of doubling the available anchoring forces needed during heavy machining operations. The anchor slots 260 may be of the dual shouldered type, and may further include springs carried within centrally formed spring pockets thereby providing the previously described dual function anchoring action. Both the locking spring 168 and the anchoring spring 178 may be of alternate geometries, including the well known Bellville spring types.

Although the invention has been described in terms of selected preferred and alternate embodiments, and in particular one preferred means of implementing the holder, the invention should not be deemed limited thereto since other embodiments and modifications will readily occur to one skilled in the art. It is therefore to be understood that the appended claims are intended to cover all such modifications as fall within the true spirit and scope of the invention.

What is claimed is:

1. A workpiece holder having a pair of separately adjustable jaws, comprising:

(a) a frame having an interiorly disposed, substantially rectangular cavity and a longitudinal axis, said cavity bounded by first, second and third outer wall portions of said frame, all of said wall portions extending orthogonally from a base portion of said frame along longitudinal axes, and said first and third walls being parallel to each other;

(b) a pair of workpiece engaging jaws each of substantially equal rectangular transverse cross section, the pair sized to slidingly fit side-by-side longitudinally within said cavity when disposed parallel to said longitudinal axis, an upper face of each jaw formed at a 45 degree angle and said pair of jaws oriented to provide a 90 degree V therebetween;

(c) each jaw further having means for engaging a longitudinally oriented adjusting screw on a lower face, and a slotted locking screw channel extending transversely through its central region;

(d) said base portion having a pair of longitudinally oriented threaded holes to carry a pair of threaded adjusting screws, each adjusting screw aligned to urge an associated jaw into longitudinally adjustable positions with respect to said base portions; and (e) said second wall portion having a pair of transversely oriented threaded holes to receive a pair of threaded locking screws, each locking screw aligned to urge an associated jaw into a frictional locking engagement with said second wall portion upon being routed through said jaw's associated locking screw channel.

2. The workpiece holder of claim 1 wherein said second wall portion further includes a pair of longitudinally oriented first dovetail elements formed into an inner wall surface bounding said cavity, and each of said workpiece engaging jaws includes a longitudinally oriented, second mating dovetail element formed into a jaw surface disposed contiguously to said inner bounding surface.

3. The workpiece holder of claim 2 wherein said first dovetail elements are female indentations adapted to matingly mesh with said second dovetail elements having male indentations.

4. The workpiece holder of claim 3 wherein said first dovetail elements each include a longitudinal track which is triangular in transverse cross section, and said second dovetail elements each include complimentary shaped tracks, whereby upon progressively urging each of said jaws into locking engagement with said second wall, said tracks progressively aid in longitudinal jaw-to-wall alignment.

5. The workpiece holder of claim 1 wherein said frame is substantially rectangular in outer shape and each outer face of said first and third walls carries at least one transversely oriented channel slot adapted to receive externally applied clamping means.

6. The workpiece holder of claim 5 wherein said first, second and third walls are separately formed and are rigidly affixed to said base portion thereby forming said frame from a plurality of components.

7. The workpiece holder of claim 5 wherein said first, second and third walls are integrally formed with said base portion as by molding or machining processes thereby forming said frame as a one piece component.

8. The workpiece holder of claim 5 wherein said base portion further includes at least one anchoring bolt channel transversely disposed therethrough, each of said locking bolt channels having a first diameter bolt head hole at one extremity and a second smaller diameter hole at its opposite extremity, whereby said holder may be securely anchored to an external device.

9. The workpiece holder of claim 8 wherein said at least one anchoring bolt channel includes an anchoring spring pocket having a cross section intermediate to said first and second diameters, whereby said anchoring to an external device is accomplished via a spring carried in said anchoring pocket.

10. The workpiece holder of claim 1 wherein said slotted locking screw channel is of racetrack-like shape with its major axes longitudinally oriented and having a first cross section at a first surface thereof and a second smaller cross section at a second surface, whereby said locking screw may effect said frictional locking engagement.

11. The workpiece holder of claim 10 wherein said locking screw channel includes a locking spring pocket having a cross section intermediate to said first and second cross sections, whereby said frictional locking engagement is accomplished via a spring carried in said locking pocket.

12. The workpiece holder of claim 10 wherein said jaw surface having said smaller cross section is oriented to be contiguous to an interior surface of said second wall bounding said cavity.

13. The workpiece holder of claim 12 wherein said means for engaging an adjusting screw of each jaw comprises a T-slot adapted to receive and rotatingly retain an adjusting screw having a corresponding T-structure formed into its contacting extremity.

14. A workpiece holder having a pair of separately adjustable jaws, comprising:

(a) a frame having an interiorly disposed, substantially rectangular cavity and a longitudinal axis, said cavity bounded by first, second and third outer wall portions of said frame, all of said wall portions extending orthogonally from a base portion of said frame along longitudinal axes, and said first and third walls being parallel to each other;

(b) a pair of workpiece engaging jaws each of substantially equal rectangular transverse cross section, the pair sized to slidingly fit side-by-side longitudinally within said cavity when disposed parallel to said longitudinal axis, an upper face of each jaw formed at a 45 degree angle and said pair of jaws oriented to provide a 90 degree V therebetween;

(c) each jaw further having means for engaging a longitudinally oriented adjusting screw on a lower face, and a slotted locking screw channel extending transversely through its central region;

(d) said base portion having a pair of longitudinally oriented threaded holes to carry a pair of threaded adjusting screws, each adjusting screw aligned to urge an associated jaw into longitudinally adjustable positions with respect to said base portions;

(e) said second wall portion having a pair of transversely oriented threaded holes to receive a pair of threaded locking screws, each locking screw aligned to urge an associated jaw into a frictional locking engagement with said second wall portion upon being routed through said jaw's associated locking screw channel;

(f) said second wall portion further including a pair of longitudinally disposed first dovetail elements formed along an inner surface bounding said cavity, and each of said workpiece engaging jaws includes a longitudinally disposed, second mating dovetail element formed into a jaw surface disposed contiguously to said inner bounding surface; and (g) said second wall portion further including a V-shaped notch centrally formed into its extremity opposite its base member contacting region, thereby providing an extension of said 90 degree V when said jaws are adjustably set to contact said base portion.

15. A workpiece holder having a pair of separately adjustable jaws, comprising:

(a) a frame having an interiorly disposed, substantially rectangular cavity and a longitudinal axis, said cavity bounded by first, second and third outer wall portions of said frame, all of said wall portions extending orthogonally from a base portion of said frame along longitudinal axes, and said first and third walls being parallel to each other;

(b) a pair of workpiece engaging jaws each of substantially equal rectangular transverse cross section, the pair sized to slidingly fit side-by-side longitudinally within said cavity when disposed parallel to said longitudinal axis, an upper face of each jaw formed at a 45 degree angle and said pair of jaws oriented to provide a 90 degree V therebetween;

(c) each jaw further having means for engaging a longitudinally oriented adjusting screw on a lower face, and a slotted locking screw channel extending transversely through its central region;

(d) said base portion having a pair of longitudinally oriented threaded holes to carry a pair of threaded adjusting screws, each adjusting screw aligned to urge an associated jaw into longitudinally adjustable positions with respect to said base portions;

(e) said second wall portion having a pair of transversely oriented threaded holes to receive a pair of threaded locking screws, each locking screw aligned to urge an associated jaw into a frictional locking engagement with said second wall portion upon being routed through said jaw's associated locking screw channel;

(f) said slotted locking screw channel being of racetrack-like shape with its major axis longitudinally oriented and having a first cross section at a first surface thereof and a second smaller cross section at a second surface, whereby said locking screw channel may affect said frictional locking engagement; and (g) said locking screw channel including a locking spring pocket having a cross section intermediate to said first and second cross sections, whereby said frictional locking engagement is accomplished via a spring carried in said locking pocket.

* * * * *